(12) United States Patent
Osseiran

(10) Patent No.: US 9,489,824 B2
(45) Date of Patent: Nov. 8, 2016

(54) ACTIVE PROBE, SYSTEM AND METHOD FOR PEST DETECTION

(75) Inventor: Adam Osseiran, Shelley (AU)

(73) Assignee: EDITH COWAN UNIVERSITY, Joondalup WA (AU)

( * ) Notice: Subject to any disclaimer, the term of this patent is extended or adjusted under 35 U.S.C. 154(b) by 55 days.

(21) Appl. No.: 14/128,613

(22) PCT Filed: Jun. 29, 2012

(86) PCT No.: PCT/AU2012/000767
§ 371 (c)(1),
(2), (4) Date: Dec. 22, 2013

(87) PCT Pub. No.: WO2013/000028
PCT Pub. Date: Jan. 3, 2013

(65) Prior Publication Data
US 2014/0123543 A1    May 8, 2014

(30) Foreign Application Priority Data

Jun. 30, 2011   (AU) ................................. 2011902585

(51) Int. Cl.
| | |
|---|---|
| *A01M 1/24* | (2006.01) |
| *A01M 1/22* | (2006.01) |
| *G08B 25/08* | (2006.01) |
| *A01M 1/02* | (2006.01) |
| *A01M 1/20* | (2006.01) |

(52) U.S. Cl.
CPC .............. *G08B 25/08* (2013.01); *A01M 1/026* (2013.01); *A01M 1/2011* (2013.01); *A01M 1/24* (2013.01); *Y10T 29/49826* (2015.01)

(58) Field of Classification Search
CPC ....................................................... A01M 1/26
USPC ............................................................ 43/131
See application file for complete search history.

(56) References Cited

U.S. PATENT DOCUMENTS

| | | | | |
|---|---|---|---|---|
| 4,937,555 | A * | 6/1990 | Litzkow ................ | A01M 1/026 340/540 |
| 5,285,688 | A * | 2/1994 | Robbins ................ | A01M 1/026 73/587 |
| 5,815,090 | A * | 9/1998 | Su ......................... | A01M 1/026 43/132.1 |
| 6,202,342 | B1 | 3/2001 | Edwards | |
| 6,445,301 | B1 * | 9/2002 | Farrell ................ | A01M 31/002 43/58 |

(Continued)

FOREIGN PATENT DOCUMENTS

| | | |
|---|---|---|
| FR | 2856826 | 12/2004 |
| GB | 1407357 A | 9/1975 |

*Primary Examiner* — Marc Burgess
(74) *Attorney, Agent, or Firm* — Michael L. Leetzow, P.A.

(57) ABSTRACT

A pest detector (1) for actively detecting pest activity within the environs of a structure. The pest detector includes a pest detection unit (2) that detects pest activity through the analysis of sounds of pest activity within a pest bait. The pest bait is typically timber or cellulose material (3). Upon detection of pest activity, a signal is sent to wireless transmitting device which transmits a radio frequency signal which includes data identifying the pest detector. Advantageously, the radio frequency is in the cellular radio frequency spectrum and is transmitted via the cellular radio network to a remote base station. The signal can be in the form of a short message service message. In this way, the pest detector can be remotely monitored and any pest activity dealt with appropriately. The pest detector can be used within a pest detection system and the pest detection unit can be retrofitted to known pest monitoring systems.

19 Claims, 9 Drawing Sheets

(56) References Cited

U.S. PATENT DOCUMENTS

| | | | |
|---|---|---|---|
| 6,766,251 B2 * | 7/2004 | Mafra-Neto | A01M 1/026 702/5 |
| 6,916,482 B2 * | 7/2005 | Ovington | A01M 1/026 43/132.1 |
| 7,271,706 B2 * | 9/2007 | Lee | A01M 1/026 43/132.1 |
| 2006/0028345 A1 | 2/2006 | Lee | |
| 2007/0169401 A1 * | 7/2007 | Chyun | A01M 1/145 43/113 |
| 2008/0074254 A1 * | 3/2008 | Townsend | G01W 1/17 340/539.11 |
| 2009/0252086 A1 * | 10/2009 | Jiang | A01M 1/026 370/328 |
| 2010/0134301 A1 * | 6/2010 | Borth | A01M 1/026 43/124 |
| 2010/0286803 A1 * | 11/2010 | Tillotson | A01M 1/026 700/94 |
| 2015/0369505 A1 * | 12/2015 | Malve | H04W 4/008 700/276 |

* cited by examiner

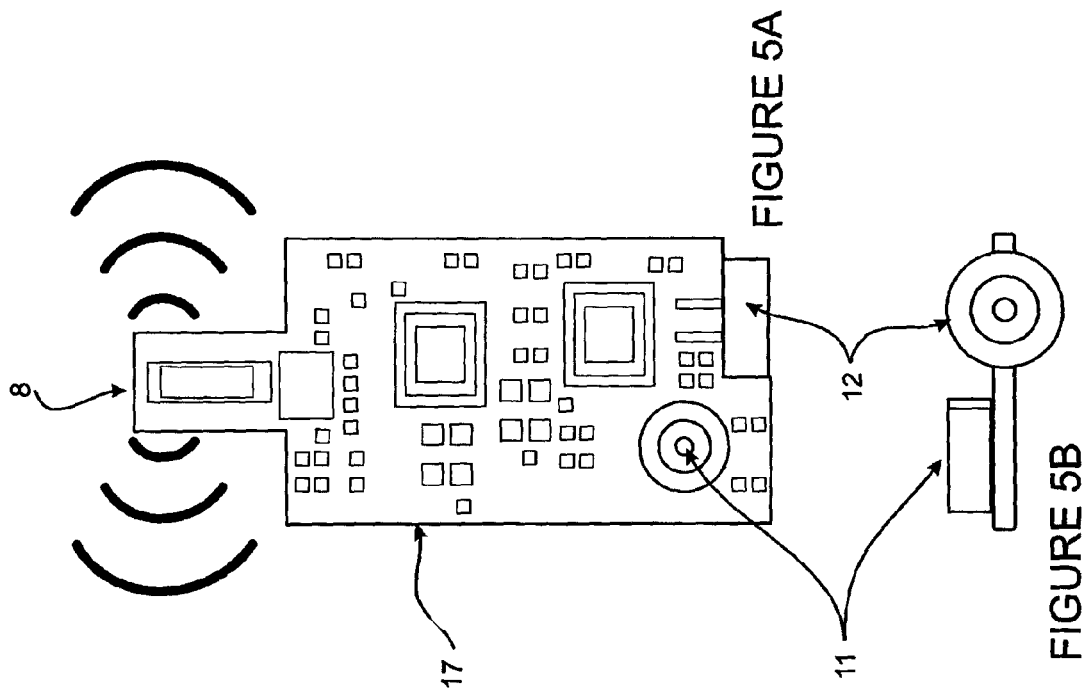
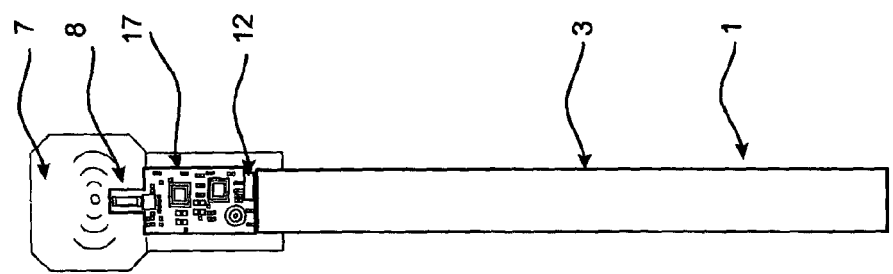

ACTIVE PROBE, SYSTEM AND METHOD FOR PEST DETECTION

The present invention relates to acoustic detection of pests, including pests such as termites and the like. Particularly, the invention comprises a pest detection system, a probe for use in the pest detection system, a detection unit for use with the probe and a method of pest detection.

BACKGROUND TO THE INVENTION

Damage caused by termites in buildings and timber structures in general are often caused by subterranean termites coming through galleries they dig in the ground from their colony nests to timber in dwellings. Once they reach it, they destroy it by chewing to on it and eventually they take the chewed fibres back to their colonies. Current termite detection techniques are applied inside the structures and therefore are post-attack techniques. The problems associated with termites attacking wood in dwellings are well known. There are other pests that burrow in wood, such as the European House. Borer Beetle. When active, these pests make sounds that humans may not be readily able to detect, however these sounds can still be detected with acoustic instruments and used to indicate the presence of the pest.

Known acoustic detection devices and systems include the use of infrared and acoustic detection in a hand-held device such as described at http://www.termatrac.com. This device however, requires the presence of a skilled person and is used very seldom or too late since they are used to check the presence of termites inside premises.

Alternatively, recent in-ground techniques using termite's 'food' probes are placed around structures. These also require regular human intervention to visually inspect the probes. In these systems, residents are expected to regularly check the probes visually around the dwelling. It is however often reported that they do it in the first few weeks/months and then cease for different reasons. In other cases the probes get covered by leaves, dirt or become inaccessible or difficult to check. Examples of these are the Green Eye (http://www.greeneyealert.com), ReKon termite treatment systems and Exterra (http://www.exterra.com.au).

The present invention seeks to provide an alternative acoustic pest detection system and method.

SUMMARY OF THE PRESENT INVENTION

According to an aspect of the present invention there is provided a pest detector comprising: a pest attraction means; a sensor arranged to receive sounds from the pest attraction means; a processor coupled to the sensor and configured to: process the sounds received by the sensor so as to detect the activity of one or more pests at the pest attraction means based on the received sounds; and to generate a first signal in response to a positive detection of pest activity; the pest detector further comprising a wireless transmitter coupled to the processor and configured to generate a data signal in response to the first signal generated by the processor; wherein the data signal includes data identifying the pest detector.

Preferably, the sensor comprises a microphone arranged adjacent the pest attraction means.

Alternatively, the sensor comprises a microphone array having a first microphone and a second microphone mounted, the first microphone being arranged to be adjacent the pest attraction means and the second microphone being spaced to one side of the first microphone.

Preferably, the wireless transmitter is operable to generate the data signal in the industrial, scientific and medical (ISM) frequency bands.

Preferably, the sensor and wireless transmitter are mounted on a printed circuit provided in a housing mounted at one end of the pest attraction means.

Preferably, the pest attraction means is a timber probe, such as a soft timber probe.

Preferably, the data signal includes a date and time stamp as well as identification data.

Preferably, the processor is operable to carry out a time domain analysis of signals from the sensor so as to compare a waveform of the sound with a target waveform characteristic of a pest activity to determine the positive detection of pest activity and to generate the first signal in response to thereto.

Preferably, the processor is operable to generate the first signal in response to the detection of a predetermined number of instances of positive detection of pest activity.

Preferably, the predetermined number is more than one.

Preferably, the pest detection unit is operable to issue a pest deterrent in response to detected pest activity.

Preferably, the pest detection unit is operable to receive commands from a remote base unit for configuration of the pest detection unit.

According to another aspect of the present invention, there is provided a pest detection system comprising a pest detector and a radio transceiver unit, the pest detector comprising: a pest attraction means; a sensor arranged to receive sounds from the pest attraction means; a processor coupled to the sensor and configured to: process the sounds received by the sensor so as to detect the activity of one or more pests at the pest attraction means based on the received sounds; and to generate a first signal in response to a positive detection of pest activity; the pest detector further comprising a wireless transmitter coupled to the processor and configured to generate a data signal in response to the first signal generated by the processor; wherein the data signal includes data identifying the pest detector, the radio transceiver being in wireless communication with the pest detector and operable to: receive the data signal from the wireless transmitter and generate an alert in response to the data signal for transmission to a remote location, the alert identifying the pest detector at which pest activity has been detected.

Preferably, the wireless transmitter is operable to generate the data signal in the industrial, scientific and medical (ISM) frequency bands, and the radio transceiver is a cellular radio telephone transceiver module.

Preferably, the alert is a short message service message.

Preferably, the message is sent to a predetermined number.

Alternatively, the alert is an email.

According to a third aspect of the present invention there is provided a detection unit for a pest detector, the detection unit being arranged for mounting within the pest detector adjacent a pest attraction means, the detection unit comprising: a sensor arranged to receive sounds from the pest attraction means; a processor coupled to the sensor and configured to: process the sounds received by the sensor so as to detect the activity of one or more pests at the pest attraction means based on the received sounds; and to generate a first signal in response to a positive detection of pest activity; the pest detector further comprising a wireless transmitter coupled to the processor and configured to generate a data signal in response to the first signal generated by the processor; wherein the data signal includes data identifying the pest detector.

Preferably, the sensor comprises a microphone arranged adjacent the pest attraction means, Alternatively, the sensor comprises a microphone array having a first microphone and a second microphone mounted, the first microphone being arranged to be adjacent the pest attraction means and the second microphone being spaced to one side of the first microphone.

Preferably, the wireless transmitter is operable to generate the data signal in the industrial, scientific and medical (ISM) frequency bands.

Preferably, the sensor and wireless transmitter are mounted on a printed circuit provided in a housing mounted at one end of the pest attraction means.

Preferably, the data signal includes a date and time stamp as well as identification data.

Preferably, the processor is operable to carry out a time domain analysis of signals from the sensor so as to compare a waveform of the sound with a target waveform characteristic of a pest activity to determine the positive detection of pest activity and to generate the first signal in response to thereto.

Preferably, the processor is operable to generate the first signal in response to the detection of a predetermined number of instances of positive detection of pest activity.

Preferably, the predetermined number is more than one.

Preferably, the pest detection unit is operable to issue a pest deterrent in response to detected pest activity.

Preferably, the pest detection unit is operable to receive commands from a remote base unit for configuration of the pest detection unit.

According to a fourth aspect of the present invention, there is provided a method of detecting pests in the environs of a structure, the method includes the steps of: placing one or more pest detectors in the environs of a structure, each pest detector being part of a pest detection system including the one or more pest detectors and a base unit, each pest detector being operable to process the sounds within the pest detector indicative of pest activity at the pest detector, and to generate a data signal in response to detected pest activity at the pest detector; wherein the data signal is received at the base unit; the base unit being operable to generate a message in response to the received data signal for transmission to a remote location, the message identifying the pest detector at which pest activity has been detected; and acting in response to the received message to implement a treatment plan.

Preferably, the treatment plan includes the step of poisoning the pests. Even more preferably, the poisoning of the pests comprises the step of replacing a pest attraction means in the pest detector with a poisoned bait.

Preferably the treatment plan includes replacing the pest detection unit with a pest baiting station.

Preferably there is provided a pest detector adapted to receive a pest detection unit.

Preferably a pest detector is adapted to receive a pest detection unit.

According to another aspect there is provided a method of detecting pests in the environs of a structure, the method including the steps of: placing one or more pest detectors in the environs of a structure, each pest detector being part of a pest detection system including the one or more pest detectors and a base unit, each pest detector being operable to process the sounds within the pest detector indicative of pest activity at the pest detector, and to generate a data signal in response to detected pest activity at the pest detector; wherein the data signal is received at the base unit; the base unit being operable to generate a message in response to the received data signal for transmission to a remote location, the message identifying the pest detector at which pest activity has been detected; and acting in response to the received message to implement a treatment plan.

According to another aspect there is provided a pest detector comprising: a sensor arranged to receive sounds from a pest attractor; a processor coupled to the sensor and configured to: process the sounds received by the sensor so as to detect the activity of one or more pests at the pest attractor based on the received sounds; and to generate a first signal in response to a positive detection of pest activity; the pest detector further comprising a wireless transmitter coupled to the processor and configured to generate a data signal in response to the first signal generated by the processor; wherein the data signal includes data identifying the pest detector.

According to another aspect there is provided a method of detecting pests in the environs of a structure, the method including the steps of: placing one or more pest detectors in the environs of a structure, each pest detector being part of a pest detection system including the one or more pest detectors and a base unit, each pest detector being operable to process the sounds within the pest detector indicative of pest activity at the pest detector, and to generate a data signal in response to detected pest activity at the pest detector; wherein the data signal is received at the base unit; the base unit being operable to generate a message in response to the received data signal for transmission to a remote location, the message identifying the pest detector at which pest activity has been detected; and acting in response to the received message to implement a treatment plan.

According to a fifth aspect of the present invention, there is provided a method of fitting a pest detection unit within a pest detector the pest detector having a housing and a pest attraction means adjacent thereto, the method including the steps of inserting the pest detection unit into the housing such that the pest detection unit is located adjacent the pest attraction means.

Preferably, the pest detection unit includes a sensor and the sensor is located adjacent at least a portion of the pest attraction means when the pest detection unit is located within the housing.

The present invention has the advantage that it provides an early detection system and can identify termites' potential attack before they actually reach the dwellings, therefore allowing for their treatment at the source before they can go further. The present invention solves the problems of often undetected and random termite attacks. Currently when termites are detected it is too late. Being an early detection system the present invention has the ability to reduce or in some cases eliminate the repair cost of damage caused by termite infestation.

DESCRIPTION OF DRAWINGS

Embodiments of the present invention will now be described, by way of example only, with reference to the accompanying drawings, in which:

FIG. 2 is a schematic illustration of a pest detection probe of the present invention;

FIG. 5A is a view of the printed circuit board used in the pest detection probe of FIG. 2;

FIG. 5B is a side view of the printed circuit board of FIG. 5A;

DETAILED DESCRIPTION OF EMBODIMENTS OF THE INVENTION

Figure 1:
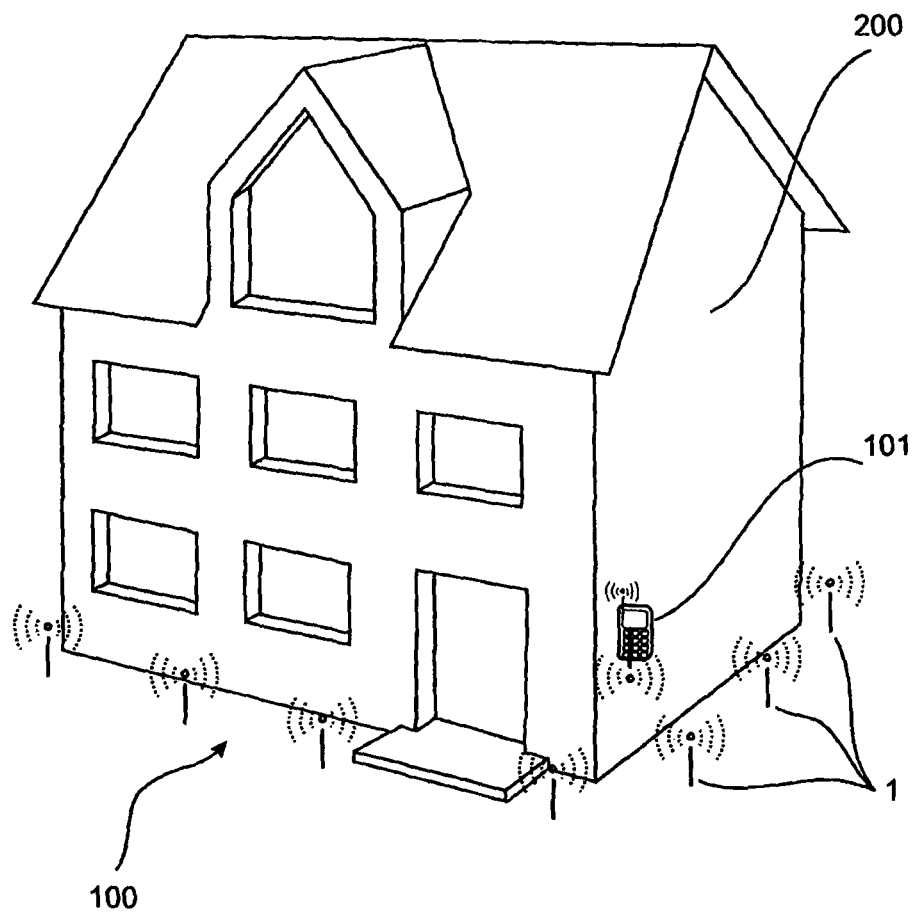
FIG. 1 is a schematic illustration of a pest detection system of the present invention in situ.
Figure 3:
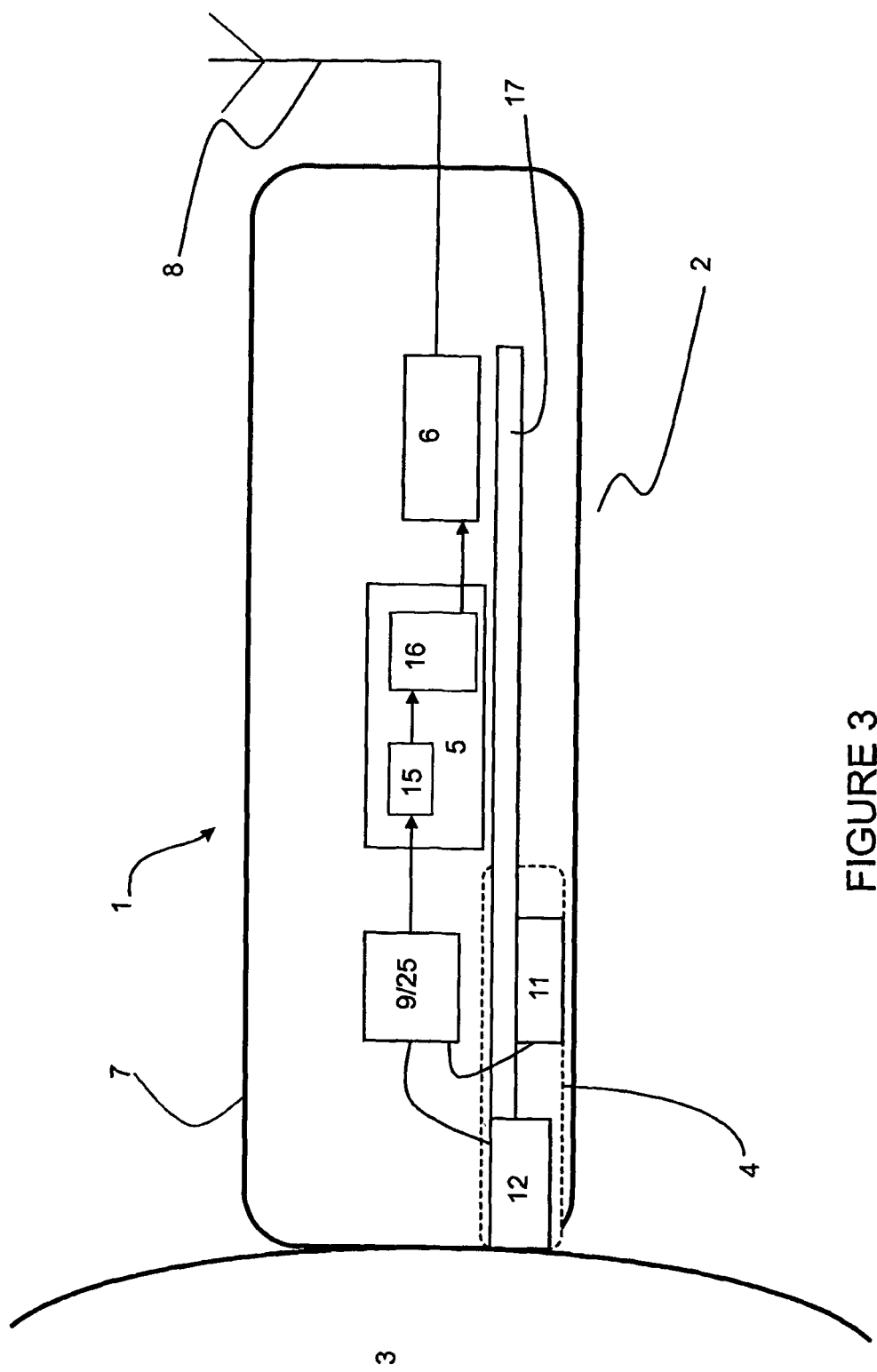
FIG. 3 is a schematic illustration of the detection unit for the pest detection probe of FIG. 2.

A first aspect of the present invention is a pest detector in the form of a pest detection probe 1 for use in a pest detection system 100. A pest detector is a device for detecting the activity of pests such as termites.

The pest detection probe 1 comprises a detection unit 2 mounted on the top of a pest attraction means in the form of a timber rod 3. The timber rod 3 is designed to act as an attraction or bait for termites. The detection unit 2 comprises an electronic acoustic sensor 4, a processor in the form of a microcontroller 5, and a wireless transmitter in the form of a Short-Range Radio Frequency module 6 ("radio module"): all provided in a water-tight housing 7 of any suitable size and material.

The radio module 6 is operable to transmit Wi-Fi signals of the industrial, scientific and medical (ISM) frequency bands (Frequency ranges: 863-870, 902-928 and 950-960 MHz).

The detection unit 2, in combination with the timber rod 3, provides an 'active probe'. This is in contrast to the known 'passive probes' described above in the Background to the Invention.

In another aspect of the invention, there is a pest detection system 100 which comprises a number of the pest detection probes 1 which are then placed at strategic distances around a structure 200—preferably in the same locations traditionally used for termite prevention chemical treatment.

The timber rods 3 comprise a pest attraction means because termites in the ground are attracted to the timber rods 3 which are staple food for termites. They are located in the path of, and before they reach (from beneath), the structures protected by the invention.

The characteristic sounds generated by the termite activities are identified by the detection unit 2 which then wirelessly sends a data signal from the radio module 6 indicating termite presence at the pest detection probe 1 to a remote wireless transceiver in the form of a cellular radio telephone base unit 101. The base unit 101 is then operable to transmit a message to an operator for appropriate action thereby. This prompts a treatment plan where the pest detection probe 1 can be replaced (without disturbing termite activity or their food source) by a closed canister baiting station for to example containing material, such as cellulose, impregnated with a delayed effect termiticide that termites will eventually carry back to their colony, wherever it is, eventually causing its destruction.

The acoustic sensor 4 is positioned to receive sounds from the activity of the termites as they attack/eat the rod 3. The microcontroller 5 is coupled to the acoustic sensor 4 to receive a signal therefrom, and which is indicative of sounds received by the acoustic sensor 4. The microcontroller 5 is configured to process the signals from the acoustic sensor 4 so as to detect activity of one or more pests at the timber rod 3 based on the received sounds. When the microcontroller 5 detects one or more pests in the rod 3 then this triggers further action as will be described in further detail below.

Referring to FIG. 2, there is shown, schematically, a pest detection probe 1 which comprises a pest detection unit 2 mounted upon a timber rod 3 as described above. The timber rod 3 is made of any suitable timber or other food source that is attractive to termites and other pests including other timber pests.

The pest detection unit 2 includes the acoustic sensor 4 which is coupled to a coder-decoder (CODEC) device 9 or a PCM device 25. The CODEC device 9 or PCM device 25 is coupled to the microcontroller 5 with associated circuitry (not shown) and mounted on a circuit board 17. The microcontroller 5 is further coupled to the detection unit radio module 6 which includes an associated antenna 8.

The acoustic sensor 4 comprises a first microphone 12 and a second microphone 11. The first microphone 12 is mounted on the printed circuit board 17 such that it is in contact with the timber rod when the pest detection unit 2 is in place on the timber rod 3. The first microphone is soldered at an angle of 90 degrees on the edge of the circuit board 17 with the antenna 8 at the other end. This is illustrated in FIGS. 5A and 5B.

The circuit board 17 sits inside the housing 7 (and into which the timber rod 3 is fitted) vertically such that the upper end of the timber probe 3 touches the first microphone 12, as can be seen in FIG. 2.

The second microphone 11 is used to measure the ambient noise so that together with first microphone 12 they become a microphone array.

The first and second microphones 12, 11 are condenser microphones and have a frequency response over the range about 50 Hz to 22 kHz. However, in certain embodiments of the invention only a first microphone 12 may be required.

The CODEC device 9 or PCM device 25 takes the analogue signals from the first and second microphones 11, 12 and converts it to a digital signal for output to the microcontroller 5.

The microcontroller 5 is in the form of a 16-bit low power microcontroller 5.

Figure 6:
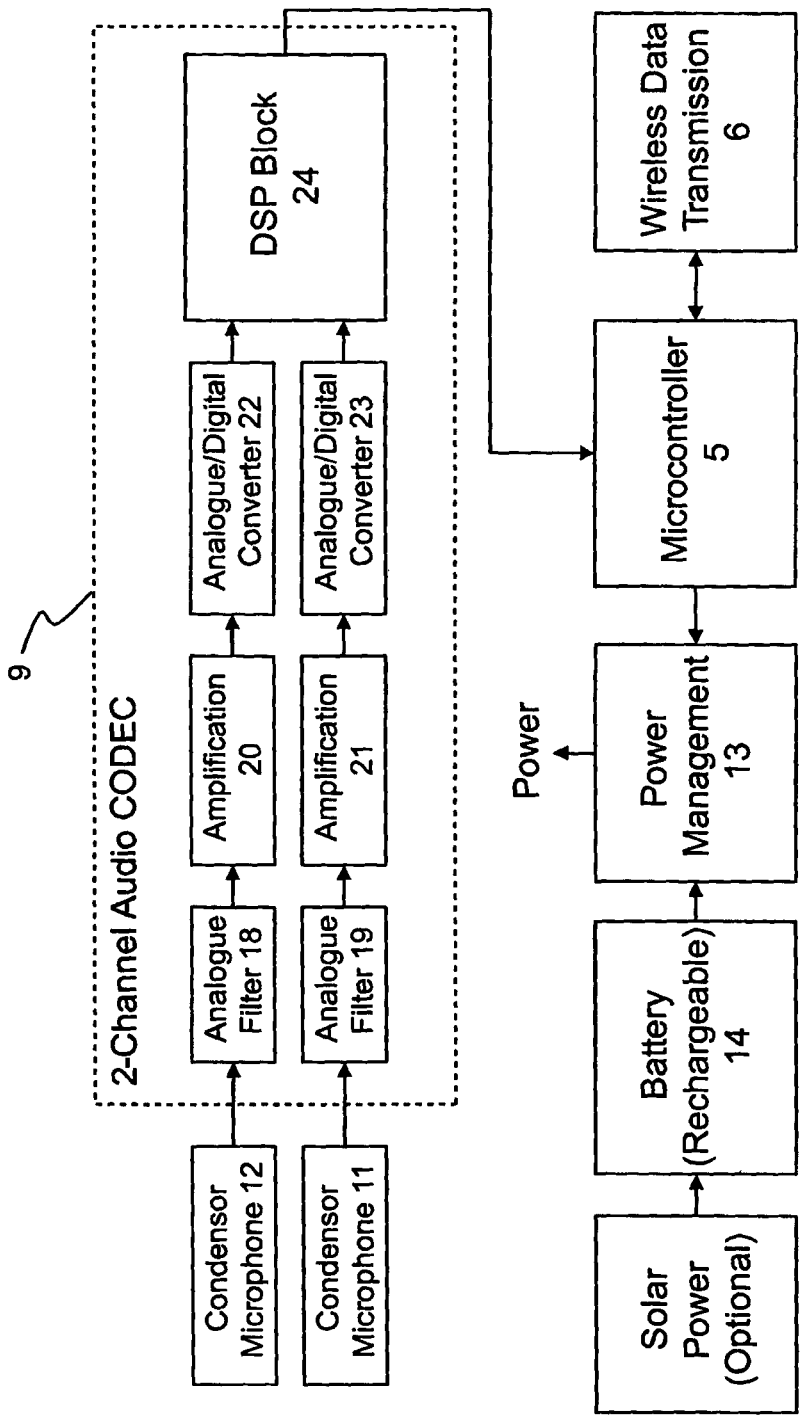
FIG. 6 is a block diagram illustrating the components of the detection unit of the probe of FIG. 2.

Referring to the embodiment shown in FIG. 6, the CODEC device 9 is a 2 channel audio CODEC device. Each microphone 12, 11 is coupled to a channel input of the CODEC device 9. Each channel has an analogue filter 18, 19, an amplifier circuit 20, 21 and an Analogue to Digital Converter (ADC) 22, 23. Each filter 18, 19 may be a 20 Hz-192 kHz band-pass filter. The digital outputs from the ADCs 22, 23 are input to a Digital Signal Processor (DSP) 24. The DSP 24 combines and processes the audio signals and provides an output to the microcontroller 5. The audio signals are combined in a manner so as to reduce ambient noise.

The microcontroller 5 may comprise internal memory for storing instructions for execution of software or firmware for controlling the operation of the DSP 24 and microcontroller 5, as well as working memory. Further extended memory may also be, provided for these purposes. The extended memory may also be used to record the audio signal from the acoustic sensor 4. The memory may be in the form of a plug-in memory module, such as a SD memory card. The extended memory may be placed inside the detection unit 2 or inside the remote base station 101.

A power management unit 13 may be provided for managing power for the power detection unit 2. Power may be derived from a battery 14, or solar cell or other suitable power sources. Power is distributed to components of the sensor by power lines (not shown).

The microcontroller 5 is configured to receive signals from the acoustic sensor 4 and to process these signals in order to detect pest activity. In response to detected pest activity, the microcontroller 5 is operable to generate a first signal to the radio module 6. The radio module 6 is then operable, in response to the first signal from the microcontroller 5, to send a data signal to a remote base station 101 with a GSM unit provided therein, as will be described in further detail below.

GSM cellular radio telephone communications technology, and ISM communications technology are well known to persons skilled in the art and need not be described in any further detail herein except as is relevant to the present invention.

Figure 7:
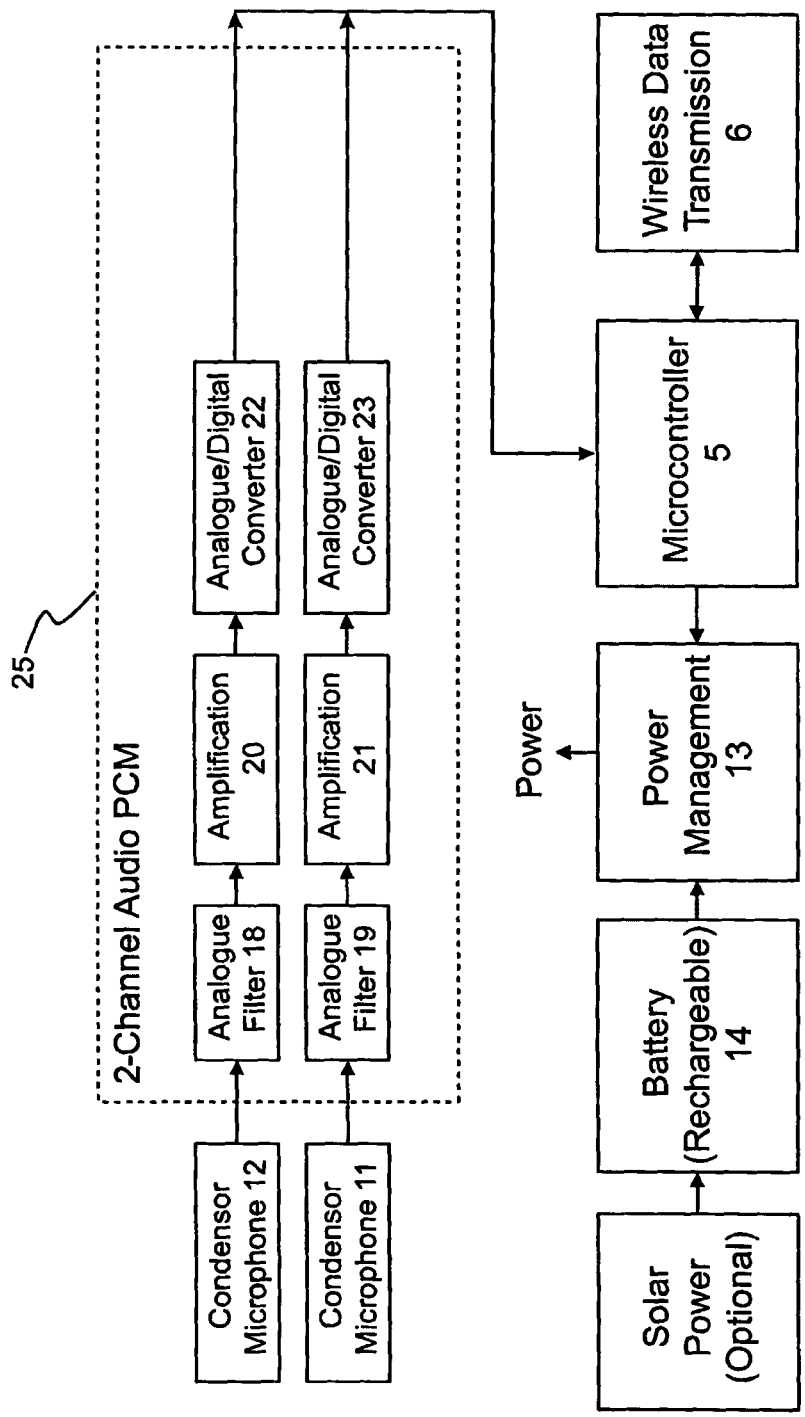
FIG. 7 is a block diagram illustrating the components of an alternate embodiment of the detection unit of the probe of FIG. 2.

In an alternative embodiment, the CODEC 9 can be replaced by a 2-Channel Pulse-code modulation (PCM) device 25. The PCM device 25 may be preferable as it is sufficient for the purpose and is of lower power and lower cost than a CODEC. This is illustrated in FIG. 7 where like components from FIG. 6 are referred to using the same reference numerals.

The detection unit 2 is mounted on the timber rod 3 so that the first microphone 12 is adjacent one end of the timber rod 3 as described above. The size of the acoustic sensor 4 along with the microphones 11, 12, detection unit radio module 6, wireless antenna 8 and associated circuitry is 40 mm×15 mm which makes it easy to append on top of any type of timber piece or existing in-ground probes.

The microcontroller 5 includes a sound detection module 15 which is operable to receive the signal from the CODEC device 9/PCM device 25 in response to detected signals from the acoustic sensor 4, and a process control module 16. The process control module 16 interfaces with the radio module 6.

The pest detection system 100 of the present invention comprises one or more pest detection probes 1 which are placed in the environs of and around a structure 200 that is to be monitored.

Figure 4:
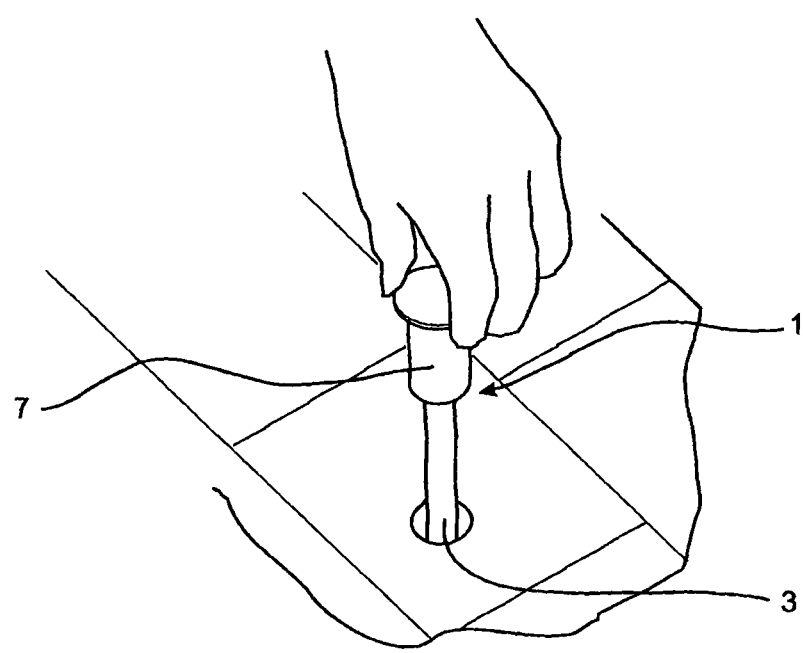
FIG. 4 schematically illustrates the use of the pest detection probe in concrete.

The pest detection probes 1 are placed in the ground. The top of the detection unit 2 can be buried flush to the ground. It can also be fitted through concrete see FIG. 4. Preferably, the probes 1 are placed in the ground at 2-3 m distance of each other and 50 cm out of the structure's walls (FIG. 1) where they form a virtual barrier continuously monitored for termites.

The timber of the timber rod 3 has sound transmitting fibres (not shown). When termites are active the sounds they make, such as friction during their motion, head banging, to chewing or biting the timber, are transmitted by the fibres and can be detected by the acoustic sensor 4.

The microcontroller 5 is operable to carry out a time domain analysis of sounds so as to compare the detected waveform of the sound with a target waveform characteristic of a termite activity such as a chewing bite, motion, head banging, etc. A positive comparison is indicative of termite activity.

The microcontroller 5 is also configured to enter a low-power consumption state between each period of processing.

During operation of the pest detection probe 1 the resulting acoustic signal acquired by the microphone array is periodically analysed using an algorithm executed in the microcontroller 5. The microcontroller 5 is configured to process the received sounds by performing a time domain analysis of sounds, as will be described below.

As mentioned above, the pest detection system 100 also includes a base unit 101 which is in communication with each of the pest detection probes 1 within the pest detection system 100. The base unit 101 is also located within the environs of the structure 200 that is being monitored. The base unit 101 includes a base unit ISM module (not shown) in communication with the detection probes 1 and a base unit GSM module (not shown) operating as a conventional GSM module as is well known in the art.

Figure 8A:
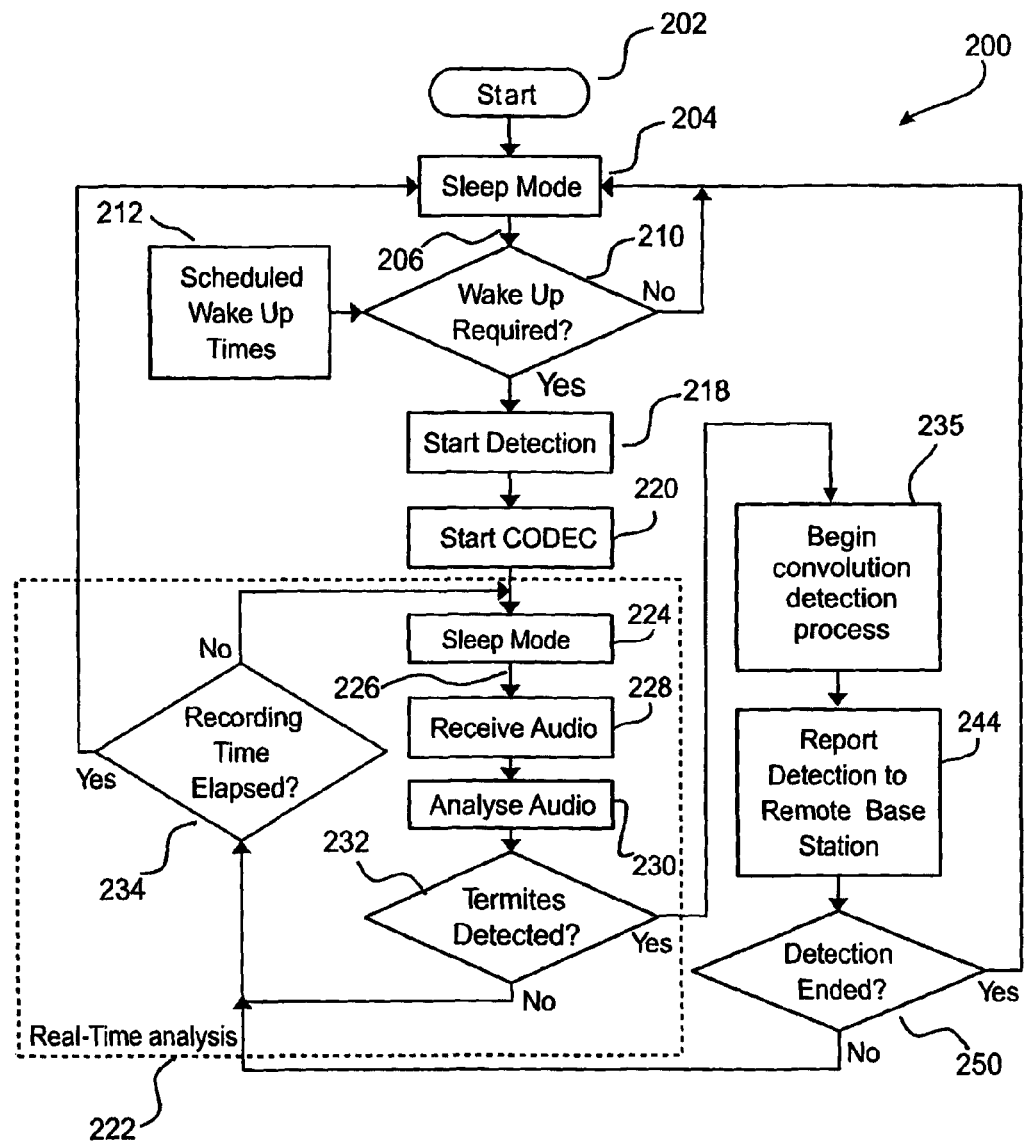
FIG. 8A is a flow chart showing a method of analysing an audio signal to detect a pest according to an embodiment of the present invention.

Referring to FIG. 8A, the method of operation 200 of the detection unit 2 is shown. The device initialises at 202. The microcontroller 5 enters a sleep mode 204 in which it assumes a low power consumption state. After a period of time, for example 500 ms, the method progresses 206 to stage 210 in which the microcontroller 5 checks for radio frequency (RF) activation from the radio module 6. Also a timer is used to check if a wake up of the microcontroller 5 is required because of or for checking for pest detection at regular intervals, for example 60 min. If a wake-up is not required at 210 the process branches to return the microcontroller 5 to sleep mode at 204. Predetermined wakeups 212 can be also scheduled, if required.

If a wake-up is required at 210 the microcontroller 5 enters a detection mode at 218 and then starts the CODEC device 9/PCM device 25 at 220.

A real-time analysis stage 222 is then commenced. In this stage the microcontroller 5 enter sleep mode at 224. At 226, when an audio frame is ready for treatment, the method transitions to step 228. The CODEC device 9/PCM device 25 receives audio from the acoustic sensor 4 at 228. The microcontroller 5 analyses the received audio at 230. At 232 if the analysis determines that termites are not detected it checks at 234 whether sufficient recording time has elapsed. If enough time has not elapsed it returns to step 224. If enough time has elapsed the CODEC device 9/PCM device 25 is stopped/powered down and the method returns to step 204.

Figure 9:
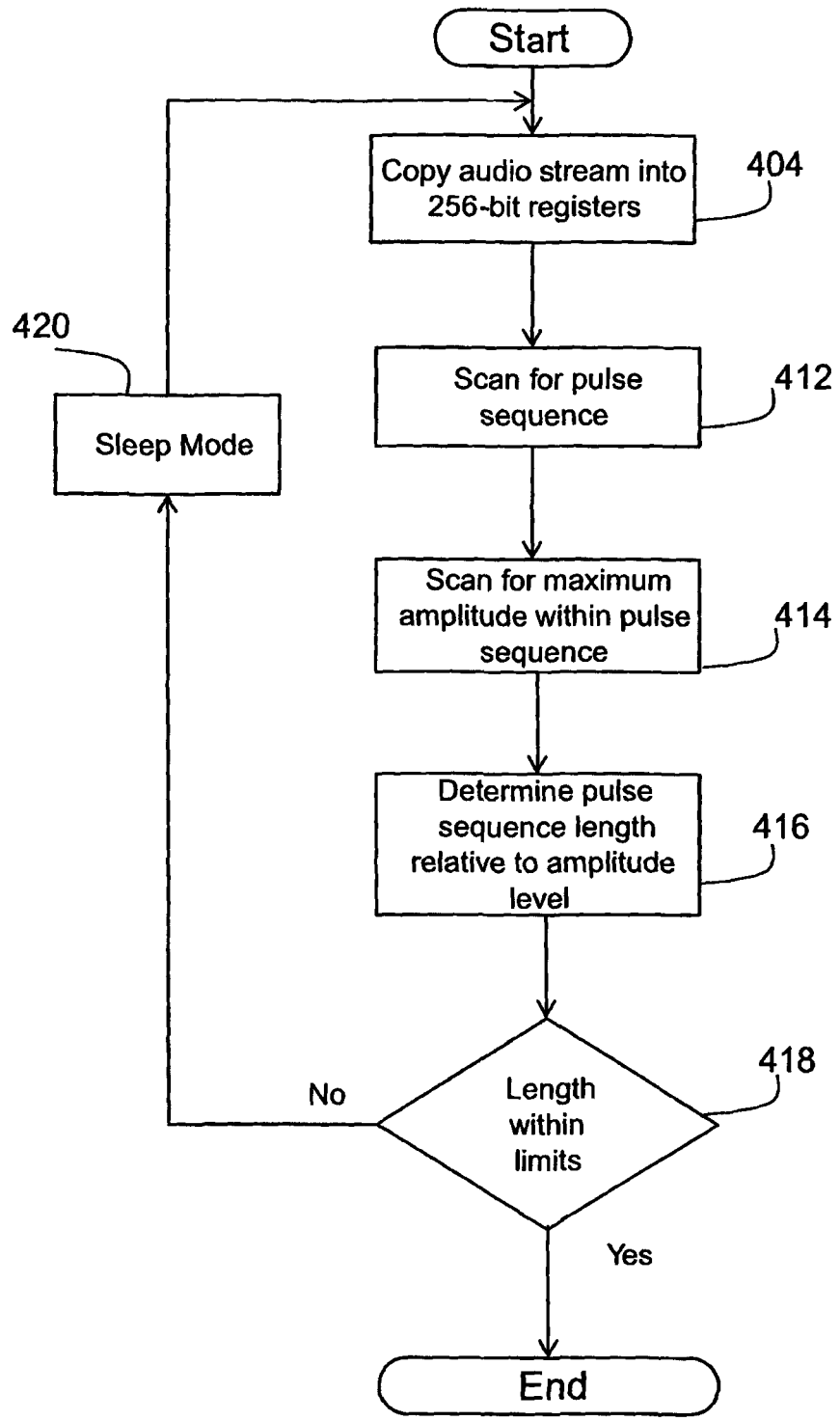
FIG. 9 is a flow chart showing a method of analysing an audio signal to detect a pest according to an embodiment of the present invention.

FIG. 9 shows a flow chart of the detection process 218 performed in an embodiment by the microcontroller 5 using time domain analysis. Firstly an audio stream is copied at 404 into a 256 registers of 16 bits each. The beginning of the time domain analysis is at 412 where a scan for a pulse sequence is performed. Then a scan for the maximum amplitude of the pulse sequence is performed at 414. Then the pulse sequence length relative to amplitude is determined at 416. Then a check is performed at 418 to determine whether the length is within a predefined limit. An example of the defined length is 1-3 ms. If not then there is no detection and the microcontroller 5 enters sleep mode at 420.

At 232 if the analysis determines that termites are detected, then, the microcontroller 5 wakes-up.

If this is the first time a termite bite is detected then the microcontroller 5 begins a convolution-based identification process 235. This convolution-based identification process 235 involves counting the number of bites detected and waiting a random time (of a minimum of 10 seconds) between consecutive bites. When the microcontroller detects a predetermined number of bites, for example, ten bites are detected then the microcontroller 5 is operable, depending upon the hardware configuration, to provide a suitable warning. By waiting until a certain number of bites are detected, the pest detection system 1 is able to protect against the detection of false positives.

The microcontroller 5 may be programmed to check the warning hardware configuration and act appropriately. For example, a check is performed at 232 to determine whether the sensor 4 is configured for warning a remote site. If so, a detection report is sent at 244, for example by use of the radio module 6.

At 250 a check is performed to determine whether the detection has ended. If so the process returns to 204 and if not the process returns to 234.

If pest activity is detected, the warning can be implemented by the microcontroller 5 being operable to send the first signal to the radio module 6, which, in response to the received first signal, is operable to send a data signal to the remotely located GSM base unit 101 as mentioned previously. The data signal includes identification (ID) data for the respective detection probe with a date and time stamp.

Upon reception of a data signal, the base station GSM module of the base unit 101 creates a short message service (SMS) message which includes the pest detection probe ID data and the date and time stamp and transmits the SMS message to a predetermined telephone number. This number could be, for example, a hotline number, an operator at a local pest control service or maintenance department. The SMS message will contain sufficient data that will enable the recipient of the SMS message to determine the exact location and position of the affected pest detection probe 1 and can therefore plan a treatment of the termites by replacing the detection unit 2 with a bait station that will provide the termite with a slow poison that termites will eventually carry back to the colony, as described above. In an alternative embodiment, the alert or warning can be in the form of an email or any other suitable alert.

In one embodiment of the invention, detection of a pest can trigger a deterrent. This may be in the form of outputting a pest repelling sound into the target zone. The pest repelling sound may be a replication of a warning sound made when a target pest threatened, such as the sound a solder termite makes when threatened. The sound may be selected according to the species of pest commonly found in the location of installation of the pest detector. Other forms of deterrent may be employed, such as release of a chemical.

An operator can use a hand-held device adapted to use the same ISM frequencies in order to communicate with the probes 100 through radio modules 6 to allow for their location in the ground. Therefore when a probe has detected termites, an operator is alerted and when on-site the operator can then use the hand-held device to quickly locate that probe in the ground more precisely.

Figure 8B:
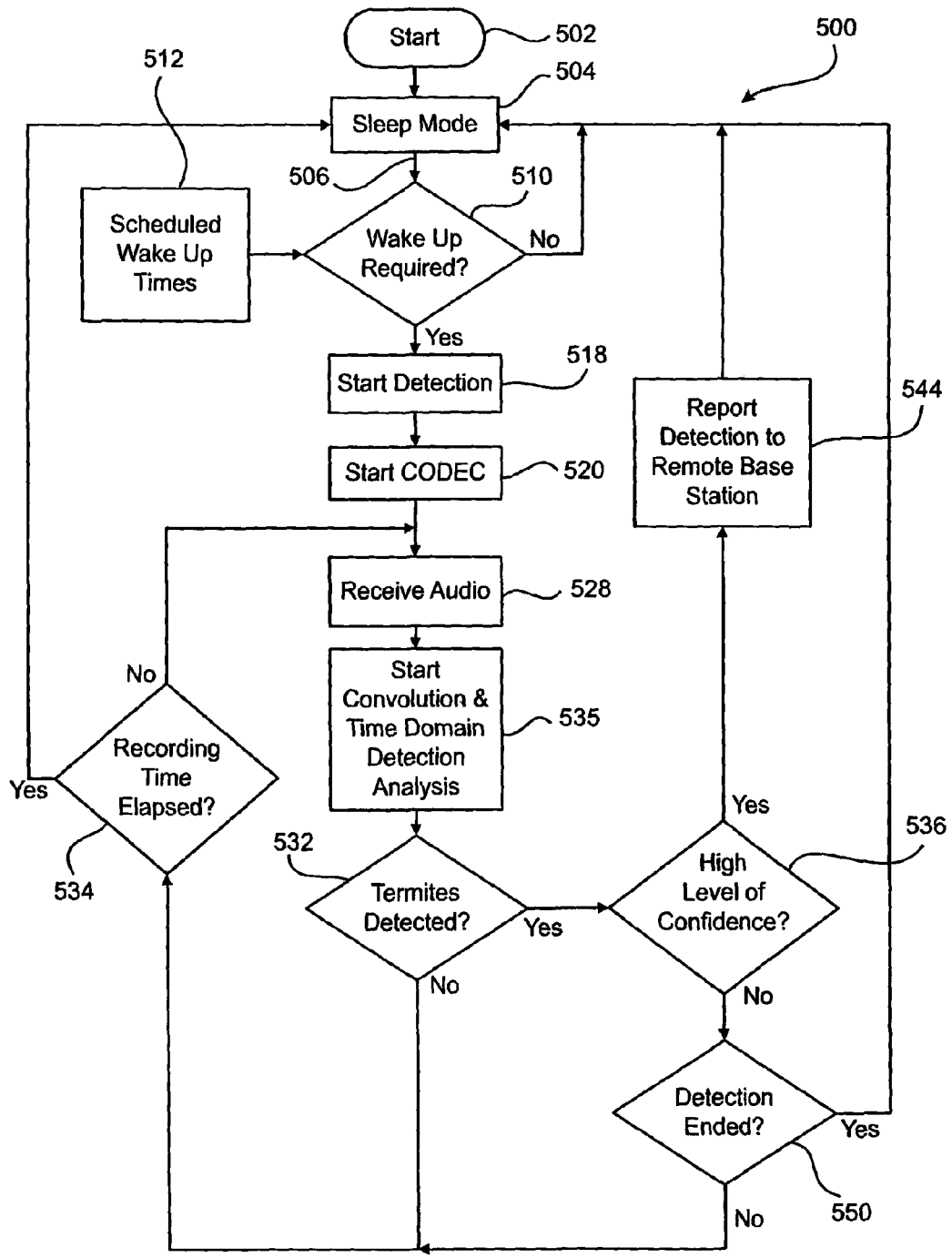
FIG. 8B is a flow chart showing an alternative method of analysing an audio signal to detect a pest according to an embodiment of the present invention.

Referring to FIG. 8B depicting an alternative method of operation 500 of the detection unit 2 is shown. The device initialises at 502. The microcontroller 5 enters a sleep mode 504 in which it assumes a low power consumption state. After a period of time, for example 500 ms, the method progresses 506 to stage 510 in which the microcontroller 5 checks for radio frequency (RF) activation from the radio module 6. Also a timer is used to check if a wake up of the microcontroller 5 is required because of or for checking for pest detection at regular intervals, for example 60 min. If a wake-up is not required at 510 the process branches to return the microcontroller 5 to sleep mode at 504. Predetermined wakeups 512 can be also scheduled, if required.

If a wake-up is required at 510 the microcontroller 5 enters a detection mode at 518 and then starts the CODEC device 9/PCM device 25 at 520.

The method then transitions to step 528. The CODEC device 9/PCM device 25 receives audio from the acoustic sensor 4 at 528. The microcontroller 5 analyses the received audio at 535 using convolution and time domain detection analysis. At 532 if the analysis determines that termites are not detected it checks at 534 whether sufficient recording time has elapsed. If enough time has not elapsed it returns to step 528. If enough time has elapsed the CODEC device 9/PCM device 25 is stopped/powered down and the method returns to step 504.

At 532 if the analysis determines that termites are detected then the microcontroller 5 determines if the detection meets a predetermined high level of confidence 536 then the detection is reported 544.

At 550 a check is performed to determine whether the detection has ended. If so the process returns to 504 and if not the process returns to 534.

The following enhancements to the pest detection unit 1 and system can be provided:

The pest detection system 100 can be interrogated remotely for sanity checks. This can be achieved using the cellular radio telephone base unit 101 to interrogate the pest detection systems 100 within its network to find out if they are operational and if not it will send an alert message.

The pest detection system 100 can produce log data and reports for zone mapping or attack frequency statistics. Specifically, each pest detection probe 1 has a precise in-ground position around a building and when termite attack occurs, the exact position, date and time of the attack is reported to operators. The log data collected can be used for a zone mapping of termite attacks per regions and frequency statistics.

The pest detection probes 1 can be configured to receive commands from the base unit 101. These commands could be in the form of a program uploaded remotely and reconfiguring each pest detection probe 1 to operate, for example, 10 seconds every hour or every four hours or more. Operation frequency will depend on the conditions deemed favourable to termite attacks, such as temperature, dampness of the soil, proximity to water, and time of the day, season etc. These parameters are known to the pest control professionals who could anticipate the necessary frequency of operation. In this regard, the detection unit 2 can include a hygrometer and thermometer for measuring humidity and temperature respectively. The hygrometer and thermometer would be coupled to the microcontroller 5. In this instance, the detection mode is bypassed if the measurements from the thermometer and hygrometer do not indicate that the ambient temperature and humidity are suitable for termite activity. In this case the microcontroller returns to sleep mode 204. Thus each pest detection probe 1 can be remotely reprogrammed to operate more or less frequently depending on the area, temperature, dampness, and any other parameter specific to the target area and known by the professionals placing the sensors.

Modifications may be made to the present invention within the context of that described and shown in the drawings. Such modifications are intended to form part of the invention described in this specification.

For example, the sensors can also be placed inside the dwellings and on each structure at risk of being attacked, such as inside the roof or near damp areas in houses or in the sheds, garages, sub-floors or any structure containing cellulose material, wood, etc. The advantage is that those sensors will also communicate with the same base unit 101.

The role of the two microphones 11, 12 could be inverted allowing the detection unit 2 to be usable on a flat surface such as walls or wall skirtings or any other surface susceptible to hide termites inside them. In this case the devices can also be used inside the same building 200 and therefore becoming part of the same network since they can also communicate with the base station 101 if they detected termites inside the building 200 (roof timber frames, behind skirtings, etc). In that case microphone 12 will be the active one and microphone 11 will be measuring the ambient noise.

In addition, rather than using the two microphones 11, 12 only one microphone can be used. This will be the microphone located adjacent the timber rod 3.

Rather than a single timber rod 3, a plurality of timber rods can be used with the one or more microphones being in direct contact with one or all of the plurality of timber rods.

The reference herein to a published document is not to be construed as an admission that any such document forms part of the common general knowledge of a person skilled in the field of the invention.

In this specification the terms "comprising" or "comprises" are used inclusively and not exclusively or exhaustively.

The invention claimed is:

1. A pest detector comprising:
a sensor arranged to receive sounds from a pest attractor;
a processor configured to enter a detection mode and a sleep mode, the processor when in the sleep mode assuming a low power consumption state and when in the detection mode being coupled to the sensor and configured to:
process the sounds received by the sensor so as to detect the activity of one or more pests at the pest attractor based on the received sounds; and
to generate a first signal in response to a positive detection of pest activity; and
a wireless transmitter coupled to the processor and configured to generate a data signal in response to the first signal generated by the processor, the data signal including data identifying the pest detector; and
a hygrometer and thermometer for measuring humidity and temperature respectively, the hygrometer and thermometer being coupled to the processor for bypassing the detection mode by entering the sleep mode if the measurements from the thermometer and hygrometer do not indicate that the ambient temperature and humidity are suitable for termite activity.

2. A pest detector according to claim 1, wherein the sensor comprises a microphone arranged adjacent the pest attractor.

3. A pest detector according to claim 1, wherein the sensor comprises a microphone array having a first microphone and a second microphone, the first microphone being arranged to be adjacent the pest attractor and the second microphone being spaced to one side of the first microphone.

4. A pest detector according to claim 1, wherein the wireless transmitter is operable to generate the data signal in the industrial, scientific and medical (ISM) frequency bands; and the sensor and wireless transmitter are mounted on a printed circuit provided in a housing mounted at one end of the pest attractor.

5. A pest detector according to claim 1, wherein the detector includes the pest attractor and the pest attractor comprises a timber probe.

6. A pest detector according to claim 1, wherein the data signal includes a date and time stamp as well as identification data.

7. A pest detector according to claim 1, wherein the processor is operable to carry out a time domain analysis of signals from the sensor so as to compare a waveform of the sound with a target waveform characteristic of a pest activity to determine the positive detection of pest activity and to generate the first signal in response thereto.

8. A pest detector according to claim 1, wherein the processor is operable to generate the first signal in response to the detection of a predetermined number of instances of positive detection of pest activity and the predetermined number is more than one.

9. A pest detector according to claim 1, the pest detector operable to issue a pest deterrent in response to detected pest activity.

10. A pest detector according to claim 1, the pest detector operable to receive commands from a remote base unit for configuration of the pest detector.

11. A pest detector according to claim 1, wherein the pest detector is adapted to fit within a pest station, the pest station including the pest attractor.

12. A pest detector according to claim 1, further comprising a pest station including the pest attractor.

13. A pest detector as claimed in claim 1 wherein the pest detector is able to be remotely reprogrammed to enter the detection mode more or less frequently depending on the temperature and humidity.

14. A pest detector as claimed in claim 1 wherein the pest detector is configured to receive commands from a base unit; the commands being able to be uploaded remotely from the base unit and on the basis of the commands reconfiguring the pest detector to operate more or less frequently.

15. A pest detector system including a plurality of pest detectors, each pest detector comprising:
a sensor arranged to receive sounds from a pest attractor;
a processor configured to enter a detection mode and a sleep mode, the processor when in the sleep mode assuming a low power consumption state and when in the detection mode being coupled to the sensor and configured to:
process the sounds received by the sensor so as to detect the activity of one or more pests at the pest attractor based on the received sounds; and
to generate a first signal in response to a positive detection of pest activity; and
a wireless transmitter coupled to the processor and configured to generate a data signal in response to the first signal generated by the processor, the data signal including data identifying the pest detector, and
a hygrometer and thermometer for measuring humidity and temperature respectively, the hygrometer and thermometer being coupled to the processor for bypassing the detection mode by entering the sleep mode if the measurements from the thermometer and hygrometer do not indicate that the ambient temperature and humidity are suitable for termite activity.

16. The pest detector system according to claim 15, further comprising a wireless transceiver configured to be in wireless communication with each pest detector and operable to receive the data signal from each wireless transmitter and to generate an alert for transmission to a remote location in response to the data signal, the alert identifying the pest detector at which pest activity has been detected.

17. A pest detector system according to claim 16, wherein the alert is a short message service message and the message is sent to a predetermined number.

18. The pest detector system as claimed in claim 15 including remotely reprogramming the pest detector to enter the detection mode more or less frequently depending on the temperature and humidity.

19. The pest detector system as claimed in claim 15 including receiving commands from a base unit; the commands being uploaded remotely from the base unit and, on the basis of the commands, reconfiguring pest detector to enter the detection mode more or less frequently depending on the temperature and humidity.

* * * * *